(12) United States Patent
Peters et al.

(10) Patent No.: US 11,156,359 B2
(45) Date of Patent: Oct. 26, 2021

(54) COMBUSTOR LINER PANEL END RAIL WITH DIFFUSED INTERFACE PASSAGE FOR A GAS TURBINE ENGINE COMBUSTOR

(71) Applicant: United Technologies Corporation, Farmington, CT (US)

(72) Inventors: Donald W. Peters, Colchester, CT (US); San Quach, Southington, CT (US); Jeffrey T. Morton, Manchester, CT (US); Matthew D. Parekh, Farmington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 14 days.

(21) Appl. No.: 16/727,178

(22) Filed: Dec. 26, 2019

(65) Prior Publication Data

US 2020/0149742 A1   May 14, 2020

Related U.S. Application Data

(63) Continuation of application No. 15/623,808, filed on Jun. 15, 2017, now Pat. No. 10,551,066.

(51) Int. Cl.
*F23R 3/00* (2006.01)
*F02C 7/18* (2006.01)
(Continued)

(52) U.S. Cl.
CPC ............... *F23R 3/002* (2013.01); *F02C 7/18* (2013.01); *F23R 3/005* (2013.01); *F23R 3/06* (2013.01); *F23R 3/60* (2013.01); *F05D 2220/32* (2013.01); *F05D 2240/35* (2013.01); *F05D 2260/20* (2013.01)

(58) Field of Classification Search
CPC .. F23R 2900/03043; F23R 2900/03042; F23R 3/04; F23R 3/002
See application file for complete search history.

(56) References Cited

U.S. PATENT DOCUMENTS

| | | | | |
|---|---|---|---|---|
| 5,079,915 A | * | 1/1992 | Veau | F02K 1/822 60/766 |
| 6,029,455 A | * | 2/2000 | Sandelis | F23R 3/002 60/752 |

(Continued)

FOREIGN PATENT DOCUMENTS

| | | |
|---|---|---|
| EP | 3056813 A1 | 8/2016 |
| GB | 2298266 A | 8/1996 |

OTHER PUBLICATIONS

European Search Report dated Oct. 16, 2018 for corresponding European Patent Application 18178091.7.
(Continued)

*Primary Examiner* — Steven M Sutherland
*Assistant Examiner* — Rodolphe Andre Chabreyrie
(74) *Attorney, Agent, or Firm* — Bachman & LaPointe, P.C.

(57) ABSTRACT

A liner panel for use in a combustor of a gas turbine engine, the liner panel including a cold side; and a rail that extends from the cold side, the rail includes a first diffusion interface passage surface and a second diffusion interface passage surface, the first diffusion interface passage surface angled with respect to the second diffusion interface passage surface.

13 Claims, 9 Drawing Sheets

(51) Int. Cl.
  *F23R 3/60*    (2006.01)
  *F23R 3/06*    (2006.01)

(56) References Cited

U.S. PATENT DOCUMENTS

| | | |
|---|---|---|
| 6,408,628 B1 | 6/2002 | Pidcock et al. |
| 2016/0230996 A1 | 8/2016 | Kostka et al. |
| 2016/0238247 A1* | 8/2016 | Staufer .................. F16J 15/062 |
| 2016/0290642 A1 | 10/2016 | Kwoka et al. |
| 2016/0377288 A1 | 12/2016 | Smith |
| 2017/0241643 A1* | 8/2017 | Mulcaire .................. F23R 3/50 |
| 2018/0306114 A1* | 10/2018 | Dudebout ............... F01D 9/065 |

OTHER PUBLICATIONS

Office Action dated Sep. 29, 2020 for corresponding European Patent Application 18178091.7.

* cited by examiner

COMBUSTOR LINER PANEL END RAIL WITH DIFFUSED INTERFACE PASSAGE FOR A GAS TURBINE ENGINE COMBUSTOR

CROSS-REFERENCE TO RELATED APPLICATIONS

The instant application is a continuation application of U.S. patent application Ser. No. 15/623,808 filed Jun. 15, 2017.

BACKGROUND

The present disclosure relates to a gas turbine engine combustor and, more particularly, to a liner panel therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes an annular combustion chamber formed by an inner and outer wall assembly. Each wall assembly includes a support shell lined with heat shields, which are often referred to as liner panels. The liner panels may be segmented to accommodate thermal growth in operation and for other considerations. The combustor liner panels include a hot side exposed to the gas path. The opposite, or cold side, has features such as threaded studs to mount the liner panel to the support shell, and a perimeter rail that contacts the inner surface of the support shells.

The liner panel perimeter rail includes a forward rail that forms the forward, or upstream, edge of the panel, an aft rail that forms the aft, or downstream, edge of the liner panel, and longitudinal side rails that connect the forward and aft rails.

The liner panels extend over an arc in a conical or cylindrical array and axially interface in regions where the combustor geometry transitions (e.g., diverges or converges). This interface may contribute to durability and flow path concerns where forward and aft, as well as circumferentially adjacent, panels abut. These interfaces may be prone to steps between panels, dead regions, cooling challenges and adverse local aerodynamics.

SUMMARY

A liner panel for use in a combustor of a gas turbine engine, the liner panel according to one disclosed non-limiting embodiment of the present disclosure includes a rail that extends from a cold side, the rail includes a first diffusion interface passage surface and a second diffusion interface passage surface, the first diffusion interface passage surface angled with respect to the second diffusion interface passage surface.

A further aspect of the present disclosure includes, wherein the first diffusion interface passage surface at least partially defines a pre-diffuser section and the second diffusion interface passage surface at least partially defines a diffuser section along one side of a diffusion interface passage axis.

A further aspect of the present disclosure includes, wherein the diffuser section of the rail defines a height with respect to the cold side between 0.05 H-0.6 H, where H is the height of the rail.

A further aspect of the present disclosure includes, wherein the diffuser section at least partially defines an expanding passage that extends at an angle between 1-15 degrees with respect to a surface that forms the pre-diffuser section.

A further aspect of the present disclosure includes, wherein the liner panel is at least one of a forward liner panel, and an aft liner panel.

A further aspect of the present disclosure includes, wherein the rail is a periphery rail that defines an edge of the liner panel.

A further aspect of the present disclosure includes, wherein the rail includes a ramped end section.

A further aspect of the present disclosure includes, wherein the rail is trapezoidal shaped.

A further aspect of the present disclosure includes, wherein the rail is ramp shaped.

A combustor for a gas turbine engine according to one disclosed non-limiting embodiment of the present disclosure includes a support shell; a first liner panel mounted to the support shell, the first liner panel including a first rail that extends from a cold side of the first liner panel, the first rail includes a diffusion interface passage surface that is non-perpendicular to the hot side; and a second liner panel mounted to the support shell, the second liner panel including a second rail that extends from a cold side of the second liner panel, the second rail adjacent to the first rail to at least partially form a diffusion interface passage.

A further aspect of the present disclosure includes a multiple of studs that extend from the first liner panel, the first liner panel mounted to the support shell via the multiple of studs, and a multiple of studs that extend from the second liner panel, the second liner panel mounted to the support shell via the multiple of studs.

A further aspect of the present disclosure includes, wherein the first liner panel is a forward liner panel.

A further aspect of the present disclosure includes, wherein the second liner panel is an aft liner panel.

A further aspect of the present disclosure includes, wherein the diffusion interface passage defines a diffusion interface passage axis oriented at 30-90 degrees with respect to a hot side of the second liner panel.

A further aspect of the present disclosure includes, wherein the diffusion interface passage defines a pre-diffuser section and a diffuser section along the diffusion interface passage axis.

A further aspect of the present disclosure includes, wherein the diffuser section of the first rail defines a height with respect to a cold side of the first liner panel between 0.05 H-0.6 H, where H is the height of the first rail.

A further aspect of the present disclosure includes, wherein the diffuser section of the first rail defines an expanding passage oriented at an angle between 1-15 degrees from an aft diffusion interface passage surface of the first rail.

A further aspect of the present disclosure includes, wherein the diffuser section of the second rail defines a height with respect to a cold side of the second liner panel between 0.05 H-0.6 H, where H is the height of the second rail.

A further aspect of the present disclosure includes, wherein the diffuser section of the second rail defines an expanding passage oriented at an angle between 1-15 degrees from a forward diffusion interface passage surface of the second rail.

A further aspect of the present disclosure includes, wherein the first rail is trapezoidal shaped.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
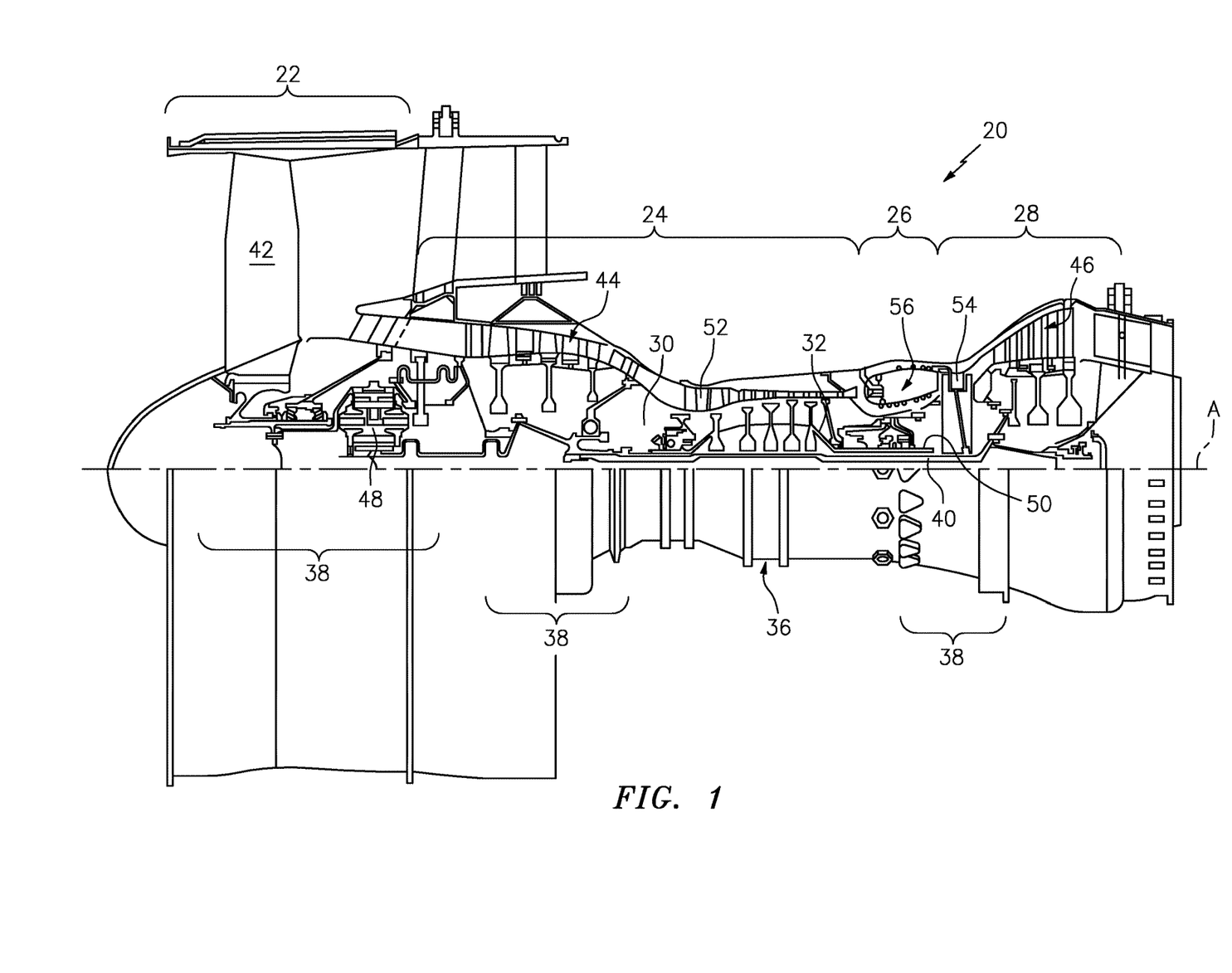
FIG. 1 is a schematic cross-section of an example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmenter section among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be appreciated that the concepts described herein are not limited to use with turbofans as the teachings may be applied to other types of turbine engines such as a turbojets, turboshafts, and three-spool (plus fan) turbofans.

The engine 20 generally includes a low spool 30 and a high spool 32 mounted for rotation about an engine central longitudinal axis A relative to an engine static structure 36 via several bearing systems 38. The low spool 30 generally includes an inner shaft 40 that interconnects a fan 42, a low pressure compressor ("LPC") 44, and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the geared architecture 48 has a gear reduction ratio of greater than about 2.3, and, in another example, is greater than about 2.5:1. The geared turbofan enables operation of the low spool 30 at higher speeds which can increase the operational efficiency of the LPC 44 and LPT 46 to provide increased pressure in a fewer number of stages. A pressure ratio associated with the LPT 46 is pressure measured prior to the inlet of the LPT 46 as related to the pressure at the outlet of the LPT 46 prior to an exhaust nozzle of the gas turbine engine 20. In this example, the bypass ratio of the gas turbine engine 20 is greater than about ten (10:1), the fan diameter is significantly larger than that of the LPC 44, and the LPT 46 has a pressure ratio that is greater than about five (5:1).

A significant amount of thrust is provided by the bypass flow due to the high bypass ratio. The fan section 22 of the gas turbine engine 20 is designed for a particular flight condition—typically cruise at about 0.8 Mach and about 35,000 feet (10668 m). This flight condition, with the gas turbine engine 20 at its best fuel consumption, is also referred to as bucket cruise Thrust Specific Fuel Consumption (TSFC). TSFC is an industry standard parameter of fuel consumption per unit of thrust. Fan pressure ratio is the pressure ratio across a blade of the fan section 22 without the use of a fan exit guide vane (FEGV) system. The low fan pressure ratio according to one non-limiting embodiment of the example gas turbine engine 20 is less than 1.45. Low corrected fan tip speed is the actual fan tip speed divided by an industry standard temperature correction of ("Tram"/ $518.7)^{0.5}$ and according to this example is less than about 1150 fps (351 m/s). It should be appreciated that the above parameters are only exemplary of one geared architecture engine and that the present disclosure is applicable to other gas turbine engines including direct drive turbofans.

Figure 2:
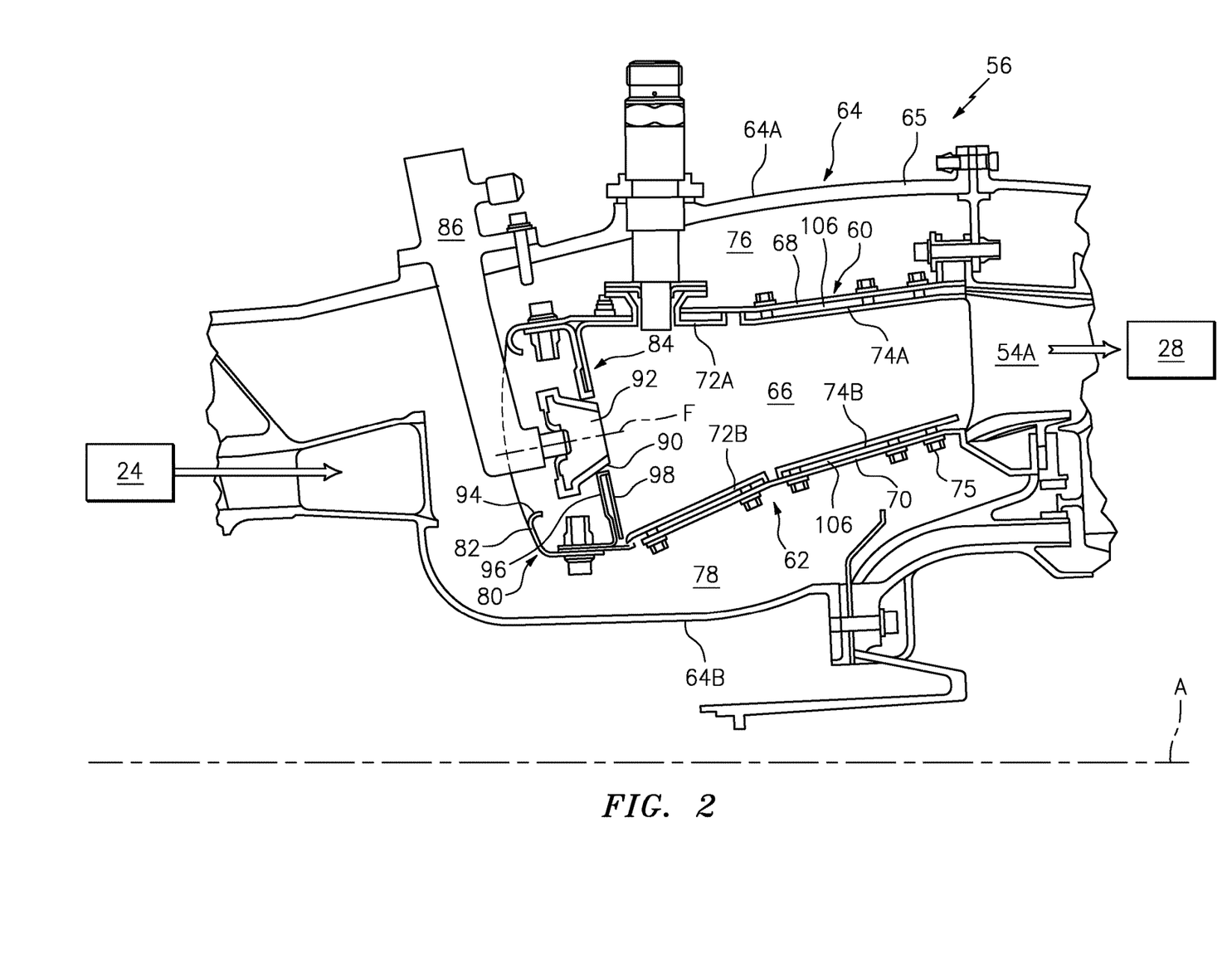
FIG. 2 is an expanded longitudinal schematic sectional view of a combustor section according to one non-limiting embodiment that may be used with the example gas turbine engine architectures.

With reference to FIG. 2, the combustor section 26 generally includes a combustor 56 with an outer combustor wall assembly 60, an inner combustor wall assembly 62, and a diffuser case module 64. The outer combustor wall assembly 60 and the inner combustor wall assembly 62 are spaced such that an annular combustion chamber 66 is defined therebetween to surround the engine central longitudinal axis A.

The outer combustor wall assembly 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. Although a particular combustor is illustrated, other combustor types with various combustor liner arrangements will also benefit herefrom.

The combustor wall assemblies 60, 62 contain the combustion products for direction toward the turbine section 28. Each combustor wall assembly 60, 62 includes a respective outer support shell 68 and inner support shell 70 which support one or more liner panels 72, 74 mounted thereto and arranged to form a liner panel array. The support shells 68, 70 may be manufactured by, for example, the hydroforming of a sheet metal alloy to provide the generally cylindrical outer shell 68 and inner shell 70. Each of the liner panels 72, 74 may have a quadrilateral projection (e.g., rectangular or trapezoidal). The liner panels 72, 74 may be manufactured of, for example, a nickel based super alloy, ceramic, or other temperature resistant material. In one disclosed non-limiting embodiment, the liner panel array includes a multiple of forward outer liner panels 72A and a multiple of aft outer liner panels 74A that are circumferentially arranged to line the outer shell 68. A multiple of forward inner liner panels 72B and a multiple of aft inner liner panels 74B are circumferentially arranged to line the inner shell 70.

The combustor 56 further includes a forward assembly 80 downstream of the compressor section 24 to receive compressed airflow therefrom. The forward assembly 80 generally includes a cowl 82, a bulkhead assembly 84, and a multiple of swirlers 90. Each of the swirlers 90 is aligned with one of a multiple of fuel nozzles 86 and a respective hood port 94 along an axis F.

The cowl 82 extends between, and is secured to, a forward section of the combustor wall assemblies 60, 62. The cowl 82 includes a multiple of hood ports 94 that each receive one of the respective multiple of fuel nozzles 86 and facilitates the direction of compressed air into the forward section of the combustion chamber 66 through a swirler opening 92. Each fuel nozzle 86 may be mounted to the diffuser case module 64 to project through one hood port 94 and respective swirler 90 mounted in the bulkhead assembly 84.

The bulkhead assembly 84 includes a bulkhead support shell 96 secured transversely to the combustor wall assemblies 60, 62, and a multiple of bulkhead liner panels 98 secured to the bulkhead support shell 96 to surround each swirler 90. The bulkhead support shell 96 is formed of a multiple of bulkhead liner panels 98 that are segmented, typically one to each fuel nozzle 86 and swirler 90.

The forward assembly 80 introduces a portion of the compressed air from the HPC 24 into the forward section of the combustion chamber 66 while the remainder enters the outer annular plenum 76 and the inner annular plenum 78. The multiple of fuel nozzles 86 and swirlers 90 produce a blended fuel-air mixture that supports stable combustion in the combustion chamber 66.

Opposite the forward assembly 80, the combustor wall assemblies 60, 62 terminate adjacent to a first row of Nozzle Guide Vanes (NGVs) 54A in the HPT 54. The NGVs 54A are static engine components which direct core airflow combustion gases onto turbine blades of the first turbine rotor in the turbine section 28 to facilitate the conversion of core airflow combustion gas pressure energy into kinetic energy. The core airflow combustion gases are also accelerated by the NGVs 54A, and due to the convergent shape, facilitate a "spin" or a "swirl" in the direction of HPT 54 rotation. The turbine rotor blades receive this energy to drive the turbine rotor at high speed.

Figure 3:
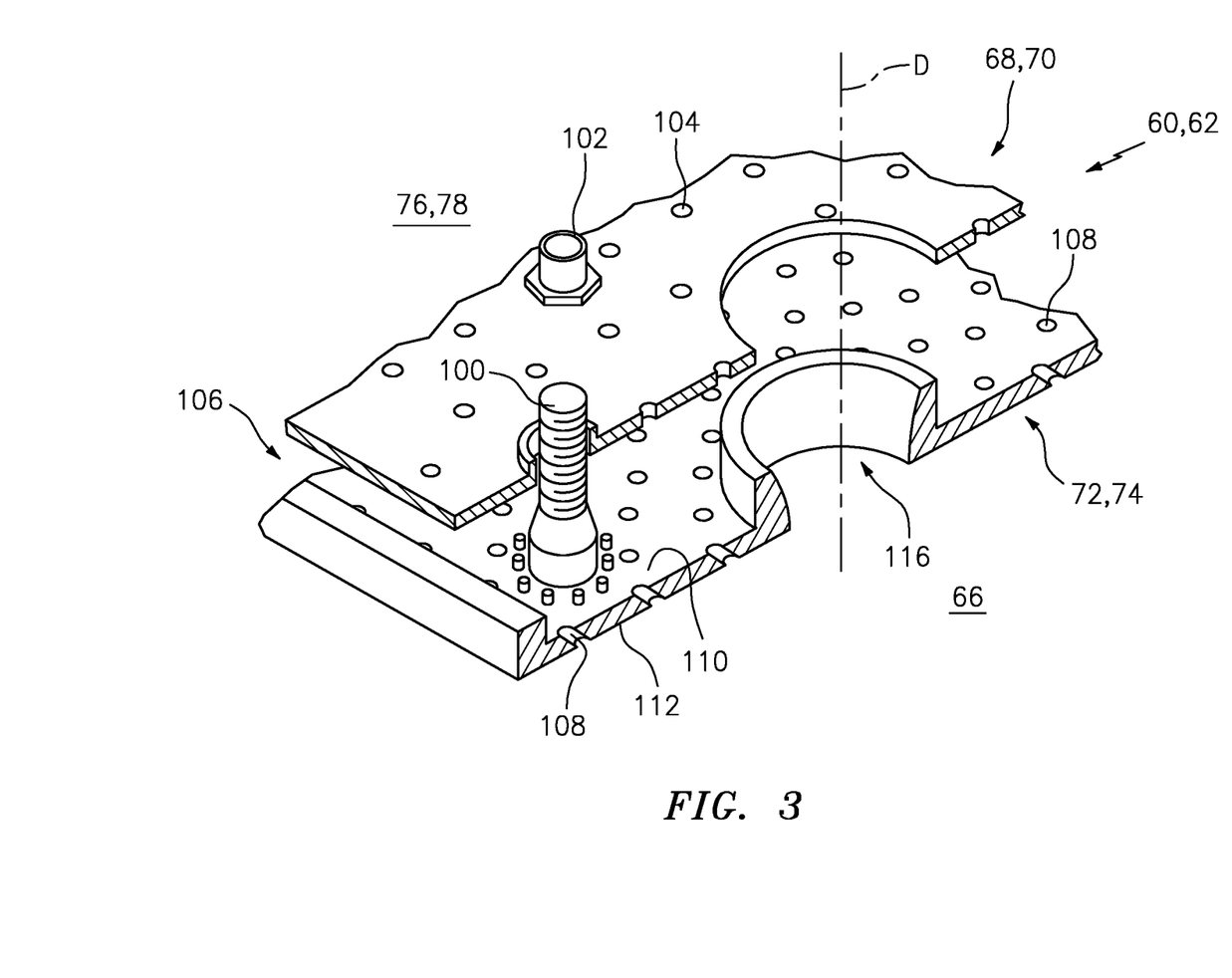
FIG. 3 is an exploded partial sectional view of a portion of a combustor wall assembly.

With reference to FIG. 3, a multiple of studs 100 extend from each of the liner panels 72, 74 so as to permit a liner array (partially shown in FIG. 4) of the liner panels 72, 74 to be mounted to their respective support shells 68, 70 with fasteners 102 such as nuts. That is, the studs 100 project rigidly from a cold side 110 of the liner panels 72, 74 to extend through the respective support shells 68, 70 and receive the fasteners 102 on a threaded section of the studs 100 (FIG. 5).

A multiple of cooling impingement passages 104 penetrate through the support shells 68, 70 to allow air from the respective annular plenums 76, 78 to enter wall cavities 106 formed in the combustor wall assemblies 60, 62 between the respective support shells 68, 70 and liner panels 72, 74. The impingement passages 104 are generally normal to the surface of the liner panels 72, 74. The air in the wall cavities 106 provides cold side impingement cooling of the liner panels 72, 74 that is generally defined herein as heat removal via internal convection.

Figure 6:
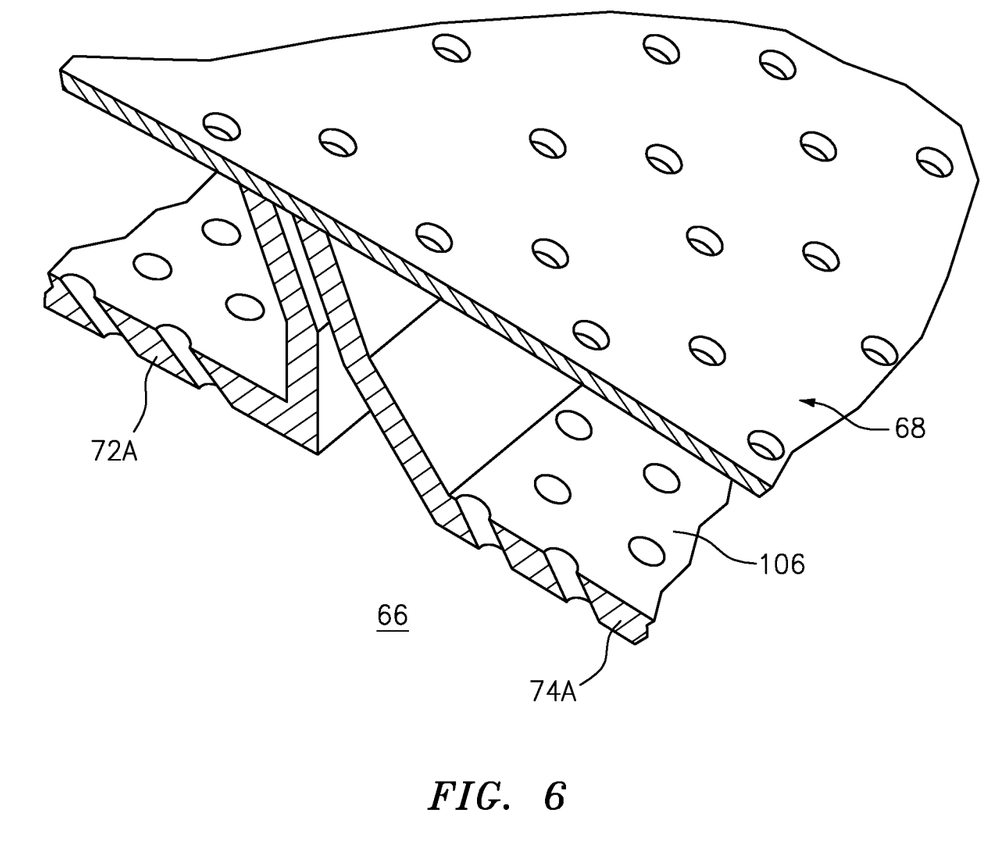
FIG. 6 is a sectional view of a portion of a combustor wall assembly.

A multiple of effusion passages 108 penetrate through each of the liner panels 72, 74. The geometry of the passages, e.g., diameter, shape, density, surface angle, incidence angle, etc., as well as the location of the passages with respect to the high temperature combustion flow also contributes to effusion cooling. The effusion passages 108 communicate air from the wall cavities 106 defined in part by the cold side 110 of the liner panels 72, 74 to a hot side 112 of the liner panels 72, 74, and thereby facilitate the formation of a thin, relatively cool, film of cooling air along the hot side 112. The effusion passages 108 are generally more numerous than the impingement passages 104 and promote film cooling along the hot side 112 to sheath the liner panels 72, 74 (FIG. 6). Film cooling as defined herein is the introduction of a relatively cooler air at one or more discrete locations along a surface exposed to a high temperature environment to protect that surface in the region of the air injection as well as downstream thereof. It should be further appreciated that the disclosed cooling flow paths as shown schematically by arrows are but an illustrated example and should not be limited only thereto.

A multiple of dilution passages 116 are located thorough the liner panels 72, 74 and the respective support shells 68, 70, each along a common axis D. For example, the dilution passages 116 are located along a circumferential line (illustrated schematically by line W; shown partially in FIG. 4). Although the dilution passages 116 are illustrated in the disclosed non-limiting embodiment as within the aft liner panels 74A, 74B, the dilution passages may alternatively be located in the forward liner panels 72A, 72B or in a single liner panel which replaces the fore/aft liner panel array.

Figure 4:
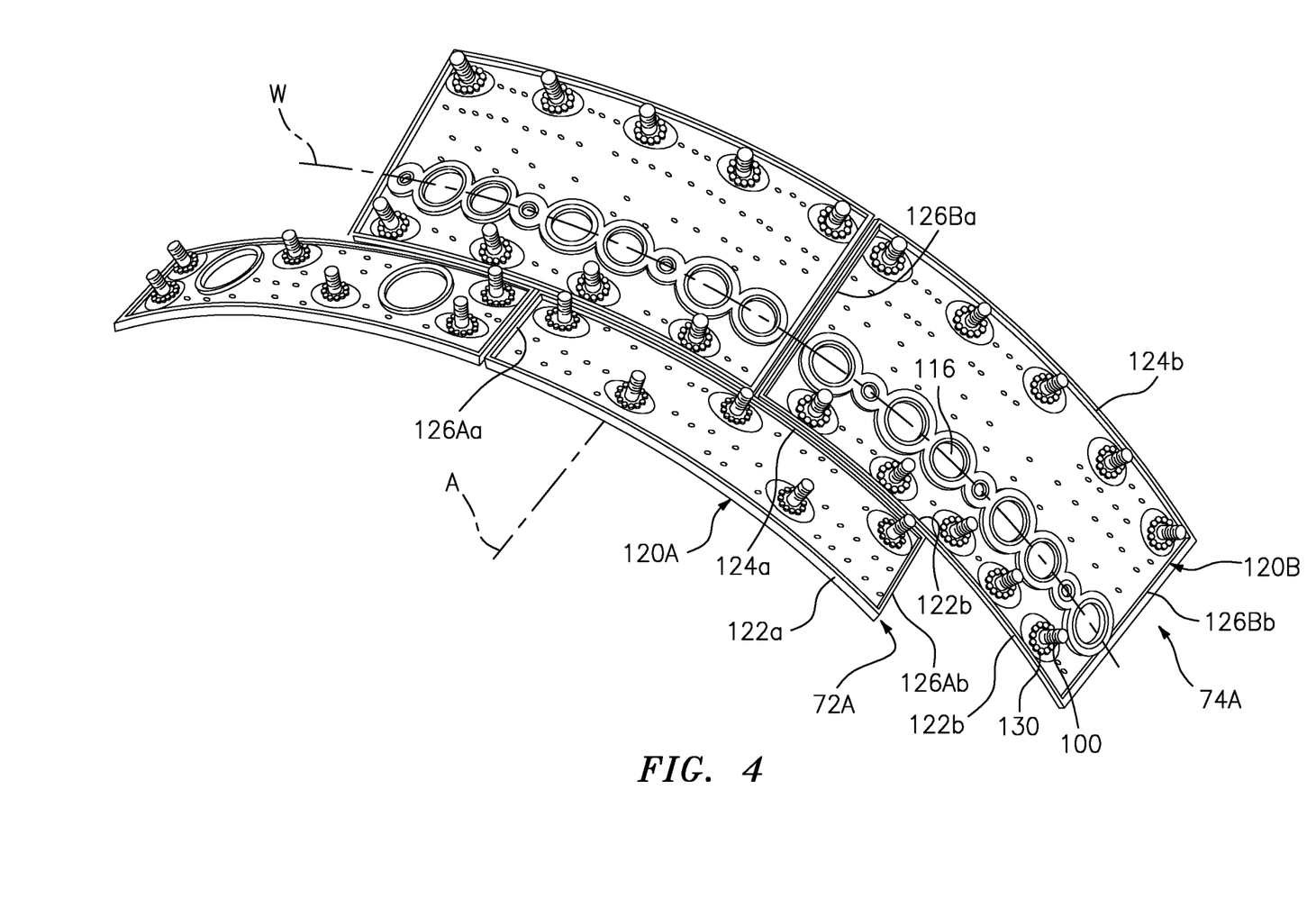
FIG. 4 is a perspective cold side view of a portion of an outer liner panel array.
Figure 5:
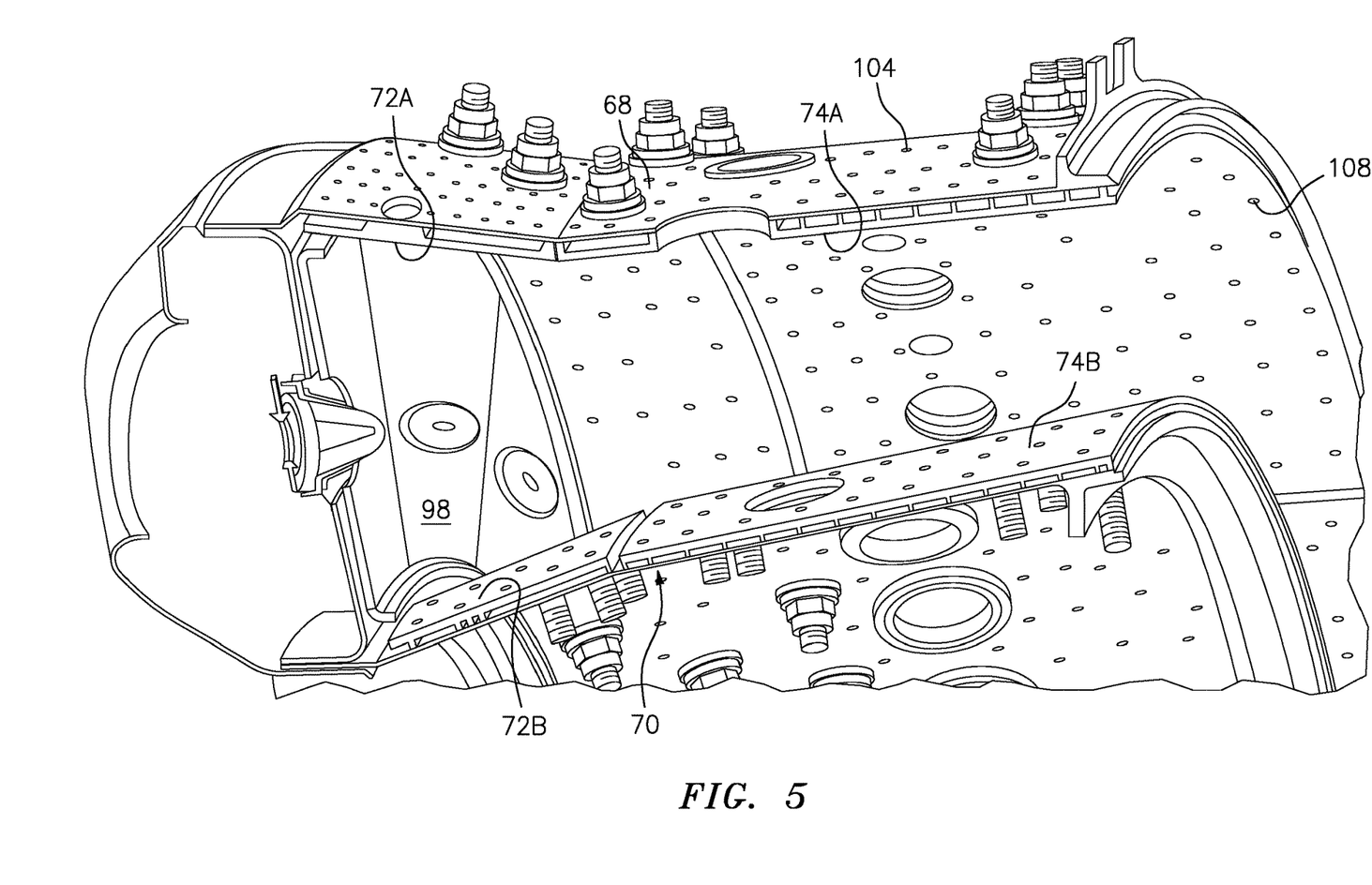
FIG. 5 is a perspective partial sectional view of the combustor.

With reference to FIG. 4, in one disclosed non-limiting embodiment, each of the forward liner panels 72A, 72B, and the aft liner panels 74A, 74B in the liner panel array includes a respective perimeter rail 120A, 120B, each respectively formed by a forward circumferential rail 122a, 122b, an aft circumferential rail 124a, 124b, and axial rails 126Aa 126Ab, 126Ba, 126Bb, that interconnect the respective forward and aft circumferential rail 122a, 122b, 124a, 124b. The perimeter rails 120A, 120B seal each liner panel with respect to the respective support shell 68, 70 to form the impingement cavity 106 therebetween. That is, the forward and aft circumferential rails 122a, 122b, 124a, 124b are located at relatively constant curvature shell interfaces while the axial rails 126Aa, 126Ab, 126Ba, 126Bb, extend along an axial length of the respective support shell 68, 70 to complete the perimeter rail 120A, 120B to seal the forward liner panel 72A, 72B and the aft liner panel 74A, 74B to the respective support shell 68, 70. Although only perimeter rails 120A, 120B of respective forward and aft liner panels 72A, 74A are described in detail, it should be appreciated that each liner panel typically includes such a perimeter rail.

The multiple of studs 100 are located adjacent to the respective forward and aft circumferential rail 122a, 122b, 124a, 124b. Each of the studs 100 may be at least partially surrounded by posts 130 to support the fastener 102 and provide a stand-off between the forward liner panels 72A, 72B, the aft liner panels 74A, 74B, and respective support shell 68, 70. The dilution passages 116 are located downstream of the forward circumferential rail 122a, 122b in the aft liner panels 74A, 74B to quench the hot combustion gases within the combustion chamber 66 by direct supply of cooling air from the respective annular plenums 76, 78. That is, the dilution passages 116 pass air at the pressure outside the combustion chamber 66 directly into the combustion chamber 66. This dilution air is not primarily used for cooling of the metal surfaces of the combustor shells or panels, but to condition the combustion products within the combustion chamber 66.

Figure 7:
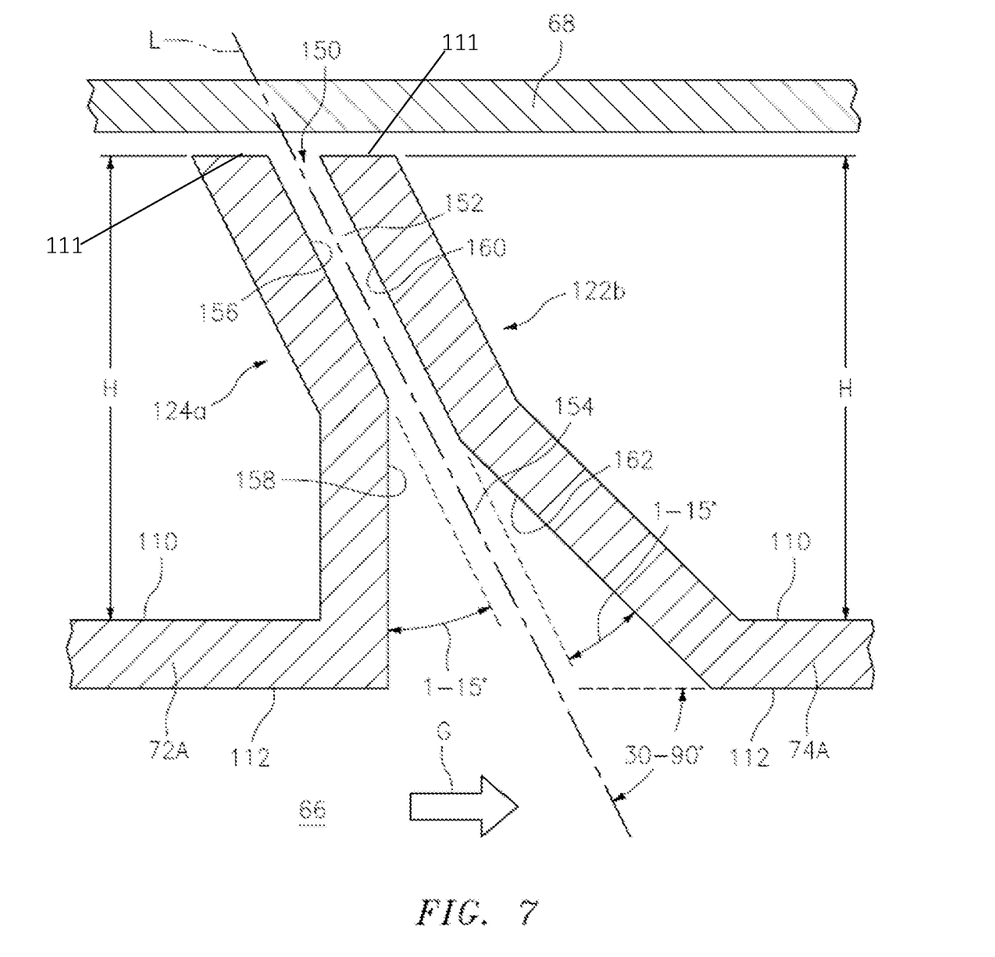
FIG. 7 is a sectional view of a combustor wall assembly with a diffusion interface passage according to one embodiment.

With reference to FIG. 7, in one embodiment, the aft circumferential rail 124a of the forward liner panel 72A is adjacent to the forward circumferential rail 122b of the aft liner panel 74A to form a diffusion interface passage 150 oriented at an angle to the gas path flow (illustrated schematically by arrow G) through the combustor 66. Although only the radially outer forward liner panel 72A and the radially outer aft liner panel 74A are illustrated in this example, to form the circumferentially arranged diffusion interface passage 150, the diffusion interface passage 150 may alternatively, or additionally, be located between the radially inner forward liner panel 72B and aft liner panel 74B, and/or axially between the respective radially outer forward outer liner panels 72A, radially outer aft liner panel 74A, radially inner forward liner panels 72B, and/or radially inner aft liner panel 74B.

The diffusion interface passage 150 forms a slot interface between the respective forward outer liner panel 72A and the aft outer liner panel 74A. The aft circumferential rail 124a and the forward circumferential rail 122b may be machined, forged, casted, additively manufactured, or otherwise formed.

In this embodiment, the diffusion interface passage 150 is oriented at an angle between 30-90 degrees with respect to the hot side 112 of the radially outer aft liner panel 74A. The diffusion interface passage 150 includes a pre-diffuser section 152 and a diffuser section 154. The diffusion interface passage 150 is angled in a direction to eject airflow therethrough generally with the gas path flow G through the combustor 66.

The aft circumferential rail 124a of the forward liner panel 72A includes a first aft diffusion interface passage surface 156 of the pre-diffuser section 152, and a second aft diffusion interface passage surface 158 of the diffuser section 154, the first aft diffusion interface passage surface 156 angled relative to the second aft diffusion interface passage surface 158. The forward circumferential rail 122b of the aft liner panel 74A also includes a first forward diffusion interface passage surface 160 of the pre-diffuser section 152 and a second forward diffusion interface passage surface 162 of the diffuser section 154, the first forward diffusion interface passage surface 160 angled relative to the second forward diffusion interface passage surface 162.

The aft circumferential rail 124a of the respective forward outer liner panel 72A and the forward circumferential rail 122b of the aft liner panel 74A extends for a height H with respect to the cold side 110 and an end edge 111 of rail 124a, 122b (FIG.7). In one example, the diffuser section 154 defines a height with respect to the cold side 110 between 0.05H-0.6H.

The diffuser section 154 is defined as an expanding passage that expands at an angle between 1-15 degrees between the first aft diffusion interface passage surface 156 and the second aft diffusion interface passage surface 158 of the aft circumferential rail 124a, and 1-15 degrees from the first forward diffusion interface passage surface 160 and the second forward diffusion interface passage surface 162 of the forward circumferential rail 122b.

Figure 8:
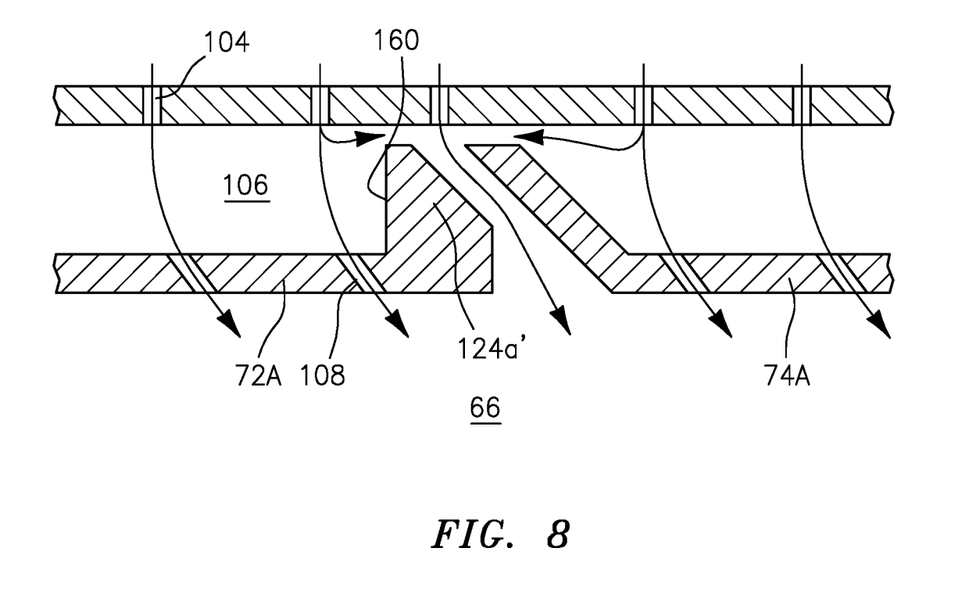
FIG. 8 is a sectional view of a combustor wall assembly with a diffusion interface passage according to another embodiment.

With reference to FIG. 8, in another embodiment, the aft circumferential rail 124a includes a forward surface 160 to form a trapezoidal shaped rail 124a in cross-section. Other shapes that facilitate manufacturability may alternatively or additionally be provided.

Figure 9:
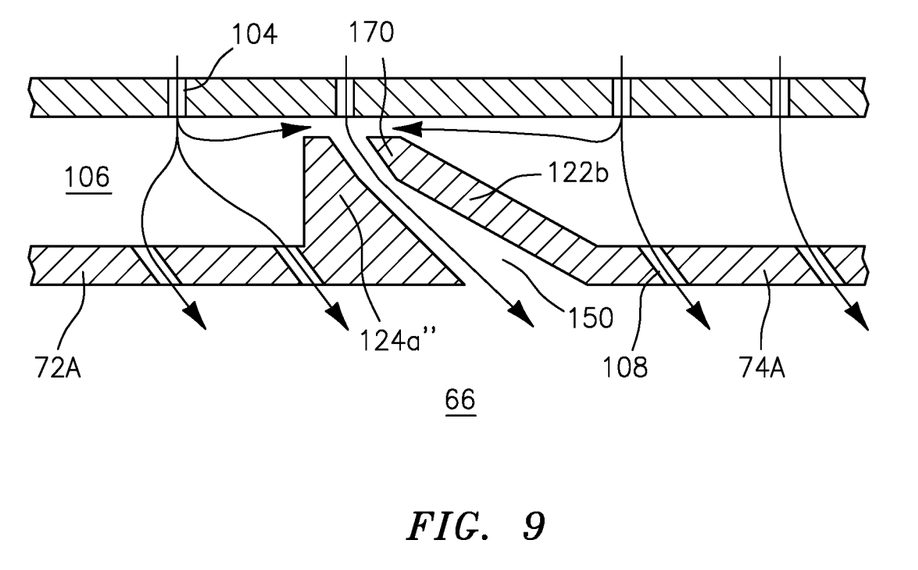
FIG. 9 is a sectional view of a combustor wall assembly with a diffusion interface passage according to still another embodiment.

With reference to FIG. 9, in another embodiment, the aft circumferential rail 124a is ramp shaped in cross-section. The forward circumferential rail 122b of the aft liner panel 74A, 74B includes a ramped end section 170 but is otherwise of the same thickness as the liner panel 74A itself. That is, the ramped end section 170 is chiseled or otherwise contoured to provide the desired diffusion interface passage 150.

The diffusion interface passage 150 ejects airflow generally along the hot side 112 of the liner panel 74 to promote film attachment to the hot side 112 and facilitate cooling effectiveness. The diffusion interface passage 150 also shields the support shell 68, 70 from a line of sight heat flow path to the combustion chamber 66. This facilitates combustor durability and time on wing.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner panel for use in a combustor of a gas turbine engine, the liner panel comprising:
   a rail that extends from a cold side until an end edge spaced apart from a support shell that supports the liner panel to define a gap extending from the shell until the end edge, the rail forms
   a first aft diffusion interface passage planar surface of a pre-diffuser section extending from the end edge, and
   a second aft diffusion interface passage planar surface of a diffuser section extending from the first aft diffusion interface passage surface until a hot side of the liner panel,
   the first aft diffusion interface passage planar surface angled relative to the second aft diffusion interface passage planar surface, the diffuser section of the rail defines a height with respect to the cold side between 0.05H-0.6H, where H is the height of the rail and the diffuser section at least partially defining an expanding passage that extends at an angle between 1-15 degrees with respect to the first aft diffusion interface passage planar surface of the pre-diffuser section.

2. The liner panel as recited in claim 1, wherein the rail forms a portion of a periphery rail that defines the end edge.

3. The liner panel as recited in claim 1, wherein the rail includes a chiseled end section to at least partially form the diffusion interface passage.

4. The liner panel as recited in claim 1, wherein the rail is trapezoidal shaped.

5. The liner panel as recited in claim 1, wherein the rail is ramp shaped.

6. A combustor for a gas turbine engine comprising:
   a support shell;
   a forward liner panel mounted to the support shell, the forward liner panel comprising an aft rail that extends from a cold side of the forward liner panel until a forward end edge spaced apart from the support shell to define a forward gap extending from the shell until the forward end edge;
   an aft liner panel mounted to the support shell, the aft liner panel comprising a forward rail that extends from a cold side of the aft liner panel until an aft end edge spaced apart from the support shell, the forward rail of the aft liner panel spaced from the aft rail of the forward liner panel to at least partially form a diffusion interface passage, wherein
   the diffusion interface passage defines a diffusion interface passage axis oriented at 30-90 degrees with respect to a hot side of the aft liner panel, the diffusion interface passage defines a pre-diffuser section and a diffuser section extending from the pre-diffuser section along the diffusion interface passage axis;
   the diffuser section defined adjacent to a hot side of the forward liner panel and the hot side of the aft liner panel, wherein
   the aft rail having
   a first aft diffusion interface passage planar surface defining a forward delimitation of the pre-diffuser section and extending from the forward end edge, and
   a second aft diffusion interface passage planar surface defining a forward delimitation of the diffuser section and extending from the first aft diffusion interface passage planar surface until the hot side of the forward liner panel,
   a forward multiple of studs that extend from a cold side of the forward liner panel, the forward liner panel mounted to the support shell via the forward multiple of studs; and
   an aft multiple of studs that extend from a cold side of the aft liner panel, the aft liner panel mounted to the support shell via the aft multiple of studs.

7. The combustor as recited in claim 6, wherein the diffuser section of the aft rail of the forward liner panel defines a height with respect to the cold side of the forward liner panel between 0.05H-0.6H, where H is the height of the aft rail.

8. The combustor as recited in claim 6, wherein the diffuser section of the aft rail of the forward liner panel defines an expanding passage oriented at an angle between 1-15 degrees from the first aft diffusion interface passage planar surface to the first aft diffusion interface passage planar surface.

9. The combustor as recited in claim 6, wherein the diffuser section of the forward rail of the aft liner panel defines a height with respect to the cold side of the aft liner panel between 0.05H-0.6H where H is the height of the forward rail.

10. The combustor as recited in claim 6, wherein the diffuser section of the forward rail of the aft liner panel has
    a first forward diffusion interface passage planar surface defining an aft delimitation of the pre-diffuser section,
    a second forward diffusion interface passage planar surface defining an aft delimitation of the diffuser section and extending from the first forward diffusion interface passage planar surface until a hot side of the aft liner panel, and
    defining an expanding passage oriented at an angle between 1-15 degrees from the first forward diffusion interface passage planar surface to the first forward diffusion interface passage planar surface.

11. The combustor as recited in claim 6, wherein the aft rail of the forward liner panel is trapezoidal shaped.

12. The combustor as recited in claim 6, wherein the aft rail of the forward liner panel is ramp shaped.

13. The combustor as recited in claim 6, wherein the forward rail of the aft liner panel is chisel shaped at an end section thereof.

* * * * *